(12) United States Patent
Gruber et al.

(10) Patent No.: US 12,214,977 B2
(45) Date of Patent: Feb. 4, 2025

(54) VAN CARGO MANAGEMENT SYSTEM

(71) Applicant: Multimatic Inc., Markham (CA)

(72) Inventors: Rudolf Gruber, Uxbridge (CA);
Michael Gordon Lehti, Ashburn (CA);
Robert Hadisutanto, Victoria (AU);
Daniel James Gebbing, Victoria (AU)

(73) Assignee: Multimatic Inc., Markham (CA)

(*) Notice: Subject to any disclaimer, the term of this patent is extended or adjusted under 35 U.S.C. 154(b) by 0 days.

(21) Appl. No.: 18/689,698

(22) PCT Filed: Sep. 2, 2022

(86) PCT No.: PCT/CA2022/051327
§ 371 (c)(1),
(2) Date: Mar. 6, 2024

(87) PCT Pub. No.: WO2023/039659
PCT Pub. Date: Mar. 23, 2023

(65) Prior Publication Data
US 2024/0270519 A1 Aug. 15, 2024

Related U.S. Application Data

(60) Provisional application No. 63/244,030, filed on Sep. 14, 2021.

(51) Int. Cl.
*B65G 67/00* (2006.01)
*B60P 7/00* (2006.01)

(52) U.S. Cl.
CPC ............... *B65G 67/00* (2013.01); *B60P 7/00* (2013.01)

(58) Field of Classification Search
CPC ...... B65G 67/02; B60P 1/6418; B60P 1/6481; B60P 1/6427; B60P 1/649; B61D 45/001; B61D 45/007
See application file for complete search history.

(56) References Cited

U.S. PATENT DOCUMENTS 3,749,268 A * 7/1973 Macomber ............... B60P 1/64
414/679
3,891,102 A * 6/1975 Blount .................. B60P 1/4421
410/67

(Continued)

FOREIGN PATENT DOCUMENTS

DE    18 06 095 A    10/1968
DE    299 05 790 U1    8/2000

(Continued)

OTHER PUBLICATIONS

International Search Report and Written Opinion for International Application No. PCT/CA2022/051327, date of mailing Dec. 4, 2023.

*Primary Examiner* — Kaitlin S Joerger
(74) *Attorney, Agent, or Firm* — Borden Ladner Gervais LLP; Brandon L. Evenson (57) ABSTRACT

A row of docking stations to stow containers or trolleys is provided along at least one side of a van cargo storage area and a corridor for loading and unloading containers or trolleys individually or in groups from the rear of the van is provided. Preferably, the docking stations are automated. Interference with the storage and removal of containers or trolleys by the wheel wells of the vans or other vehicles is eliminated. Motorized mechanisms capture and lift the containers or trolleys above the level of the wheel wells for stowage in the docking stations to maximize the available storage area beyond that available on the floor of the cargo area. Individual containers or trolleys may be maintained in docking stations until needed.

18 Claims, 11 Drawing Sheets

(56) References Cited

U.S. PATENT DOCUMENTS

| | | | |
|---|---|---|---|
| 4,093,089 A * | 6/1978 | Bohman | B60P 7/06 |
| | | | 414/545 |
| 7,025,548 B2 | 4/2006 | Krawczyk et al. | |
| 10,227,178 B2 | 3/2019 | High et al. | |
| 2010/0237653 A1* | 9/2010 | Rydberg | B60J 5/108 |
| | | | 160/311 |
| 2014/0205392 A1* | 7/2014 | Wisniewski | B60P 1/6418 |
| | | | 410/52 |
| 2014/0205408 A1* | 7/2014 | Wisniewski | B60P 1/6418 |
| | | | 414/813 |
| 2014/0219757 A1* | 8/2014 | Wisniewski | B60P 1/6418 |
| | | | 414/812 |
| 2016/0272469 A1 | 9/2016 | Carroll | |
| 2018/0178997 A1* | 6/2018 | Burrell | B60R 9/06 |
| 2019/0143872 A1* | 5/2019 | Gil | B60P 1/54 |
| | | | 211/86.01 |
| 2019/0217766 A1* | 7/2019 | Altobelli | B60P 7/135 |
| 2019/0315279 A1* | 10/2019 | Eichstedt | B60R 5/003 |
| 2020/0198515 A1* | 6/2020 | Eichstedt | B60P 1/43 |
| 2020/0207250 A1* | 7/2020 | Jarvis | G01C 21/3623 |
| 2020/0209865 A1* | 7/2020 | Jarvis | B66F 9/063 |
| 2020/0346572 A1* | 11/2020 | Merta | B60P 1/649 |
| 2021/0402908 A1* | 12/2021 | Cochrane | B60P 1/6427 |
| 2022/0281372 A1* | 9/2022 | Seemüller | B60P 1/5442 |
| 2022/0297939 A1* | 9/2022 | Chen | B60P 1/6436 |
| 2022/0396192 A1* | 12/2022 | Paul | B66F 9/063 |

FOREIGN PATENT DOCUMENTS

| | | |
|---|---|---|
| DE | 10 2022 105 872 A1 | 9/2022 |
| GB | 2 375 095 A | 11/2002 |

\* cited by examiner

VAN CARGO MANAGEMENT SYSTEM

The present disclosure claims priority from U.S. Provisional Patent Application No. 63/244,030, filed Sep. 14, 2021, which is incorporated herein by reference in its entirety.

BACKGROUND

The use of courier delivery has increased dramatically over recent years. At the regional or local level, packages are typically loaded onto vans or similar vehicles for delivery to their final destinations. Sometimes, packages are placed on shelves or the floor of the cargo area of the vehicle. Packages may alternatively be stored in discrete containers which may be loaded on and unloaded from the vehicle for transport. The use of multiple wheeled carts or trolleys to hold packages grouped logically provides a valuable alternative to loosely stacked or stored packages. The use of wheeled storage trolleys eliminates the need for a separate hand-held dolly which must be manipulated to hold non-wheeled containers for removal from the vehicle. For example, packages destined for a single destination, or for multiple destinations within a reasonably close geographical area such as a city block or segment of a city street, may be grouped in a trolley. Each trolley may be locked or otherwise secured so that only a delivery person is able to access the packages contained within the trolley. This feature provides security against theft and minimizes other delivery problems owing to confusion in delivery instructions or implementation.

With modern technologies, each package may also be identified and tagged electronically with a significant amount of information. RFD (radio frequency device) or other wireless technology may be employed for this purpose. Thus, it is possible to verify that each package is placed in an appropriate trolley when the trolleys are loaded. It is also possible for the driver of the delivery van, or another designated person riding in the van, to quickly match the package destination with the package in its trolley in order to retrieve the package at the appropriate stop.

In certain circumstances, it may be appropriate to remove an entire trolley or group of trolleys from the van to be rolled to a final destination or series of destinations. Clearly, the geometries of the cargo areas of the vans dictate the number of trolleys which may be held at any given time. A system to move the trolleys within the cargo area is also required so that an appropriate trolley, or group of trolleys, may be unloaded at a selected time. Trolleys may be shuffled around so that the selected trolley may be removed from a door of the vehicle. Such doors are typically located at the sides or at the rear of the vehicle. Although such systems are useful, they are limited by the available floor space, which in turn is limited by the interior wheel wells. Also, depending on the number of trolleys in a van cargo area, the process for shuffling them to release a desired trolley may be more or less complicated. In the limit, if the trolleys were closely packed leaving no room for shuffling them within the van, one or more trolleys would have to be removed from the van in order to allow the remaining trolleys to be shuffled.

SUMMARY

Accordingly, it would be useful to provide a van cargo management system which optimized the number of containers or trolleys which could be transported, while simultaneously facilitating ease of selecting and removing from the van a selected container or trolley, or group of containers or trolleys, and for replacing them. Although the term van is used herein, such a cargo management system would be useful in a variety of vehicular applications including panel vans, cube vans, moving trucks and the like.

In a principal aspect of the invention, a row of docking stations to stow containers or trolleys is provided along at least one side of the van cargo storage area and a corridor for loading and unloading containers or trolleys individually or in groups from the rear of the van is provided. Preferably, the docking stations are automated.

In a further aspect of the invention, interference with the storage and removal of containers or trolleys by the wheel wells of the vans or other vehicles is eliminated. This is accomplished by providing motorized mechanisms which capture and lift the trolleys above the level of the wheel wells for stowage in the docking stations to maximize the available storage area beyond that available on the floor of the cargo area. Individual containers or trolleys may be maintained in docking stations until needed. The mechanisms may capture and lift all containers or trolleys above the level of the wheel wells, or only those in the vicinity of the wheel wells. An advantage of stowing all containers or trolleys above the floor level of the cargo storage area is improved access to the containers or trolleys by operators especially in the case where an individual package, or a limited number of packages, is to be removed therefrom for delivery.

In a further aspect, trolleys are loaded and unloaded from the rear of the vehicle. Trolleys move in a corridor in the cargo area thus eliminating the need to shuffle trolleys in order to select one or more trolleys for removal from the vehicle. In the case of trolleys maintained in docking stations on either side of the cargo storage area, a central corridor is optimal.

In a further aspect, since the trolleys may be locked and secured in place when stowed, thus minimizing both the risk of theft of the packages locked in the trolleys and unauthorized removal of the trolleys themselves, the rear door may be eliminated and the trolleys may be loaded and unloaded through an open portal. An inclined ramp or ramps may be deployed for loading and unloading. Alternatively, an elevating platform which moves vertically from the level of the cargo area floor downwards to ground level or upwards to a higher loading area, and back again, may be employed. Either a ramp or ramps, or an elevating platform, may be operated manually although powered operation is preferable to reduce the need for operator involvement.

In a further aspect, one or more rear doors may be provided. Said doors may function in a standard fashion or be modified to function as a door or doors and, alternatively, as a ramp or ramps.

In a further aspect, the containers or trolleys are provided with an electronic identifier, or tag, which allows the operator of the vehicle operating a controller to select the container or trolley, or containers or trolleys, corresponding to a delivery location, or grouping of delivery locations, to retrieve from a stowed position the container or trolley, or containers or trolleys, and to place the container, trolley, containers or trolleys in the corridor for removal. In the case of containers or trolleys stowed on either side of the cargo space area, the corridor is preferably located centrally to allow released containers or trolleys to pass between rows of containers or trolleys stowed in docking stations.

With respect to the electronic identification of individual packages and of containers or trolleys, a controller may be located in the cab of the van to allow the driver or other operator to select packages or one or more containers for release pending delivery. The process of releasing containers or trolleys from their stowed positions may be initiated from the cab. Alternatively, or in addition, the controller may be mounted adjacent the rear of the van so that the operator can visually verify the acceptability of opening the door or doors, or deploying the ramp or ramps. In a further alternative, the controller may be handheld and carried with the operator.

In a further aspect, a container or trolley may be preselected for removal from stowage while the van is in transit, but remain secured until the van is stopped and placed in park mode, whereupon it is unsecured for removal from the van. A group of containers or trolleys may also be so preselected.

In a further aspect, a safety interlock system may be employed to ensure that all containers or trolleys are securely stowed before the van may be placed into motion. This system may control the van gear shift to prevent shifting into drive mode gear until there is electronic verification that all containers or trolleys are safely stowed.

In a further aspect, guiding means such as magnetic strips may be mounted to the floor of the cargo storage area, and to the ramp or ramps at the rear of the van, which may communicate with sensors mounted to the bottom of the trolleys. The trolleys may be provided with electric motors and adapted to move at a controlled speed into and out of the van guided by the guiding means. Thus, the trolleys may be loaded and unloaded from the van without the need for operator assistance once the trolleys are located appropriately and in communication with the guiding means. The trolleys may be located precisely within the van storage area using the mechanisms to stow and release the trolleys. Outside the vans, an operator must place the trolleys adjacent the guiding means or, alternatively, the trolleys may be guided through remote control.

In a further aspect, the controller may be operated remotely and distant from the van such that the entire process of loading and unloading may be controlled remotely. This is particularly useful in the case of autonomous vehicles where no human driver or operator is present.

In a further aspect, containers or trolleys are secured in their stowed positions by locking arms which may extend to the sides of the containers or trolleys, or overhead thereof, or both.

Further aspects of the invention are apparent from the attached figures and accompanying descriptions.

DETAILED DESCRIPTION

Although this invention may be applied to various vehicles, the typical application is in a cargo van. A van (1) is provided with a cargo management system (3). A typical van comprises a cab (5) and a cargo space (7). Particularly with autonomous vehicles, a cab (5) may not be required and the cargo management system (3) may be controlled remotely or autonomously. The van cargo space (7) generally has a rectangular base although the base may be square or another shape which lends itself to the cargo management system (3) described here. The cargo space (7) is defined by a floor (9), a roof (11), a front wall (13), a rear wall (15), and side walls (17, 19). In a preferred embodiment, the rear wall (15) is provided with a rear opening (21) to provide access to the cargo space (7). The cargo space (7) is designed to hold multiple containers (23). In a preferred embodiment, at least two containers (23) are adapted to be stowed longitudinally adjacent each side wall (17, 19).

Figure 1:
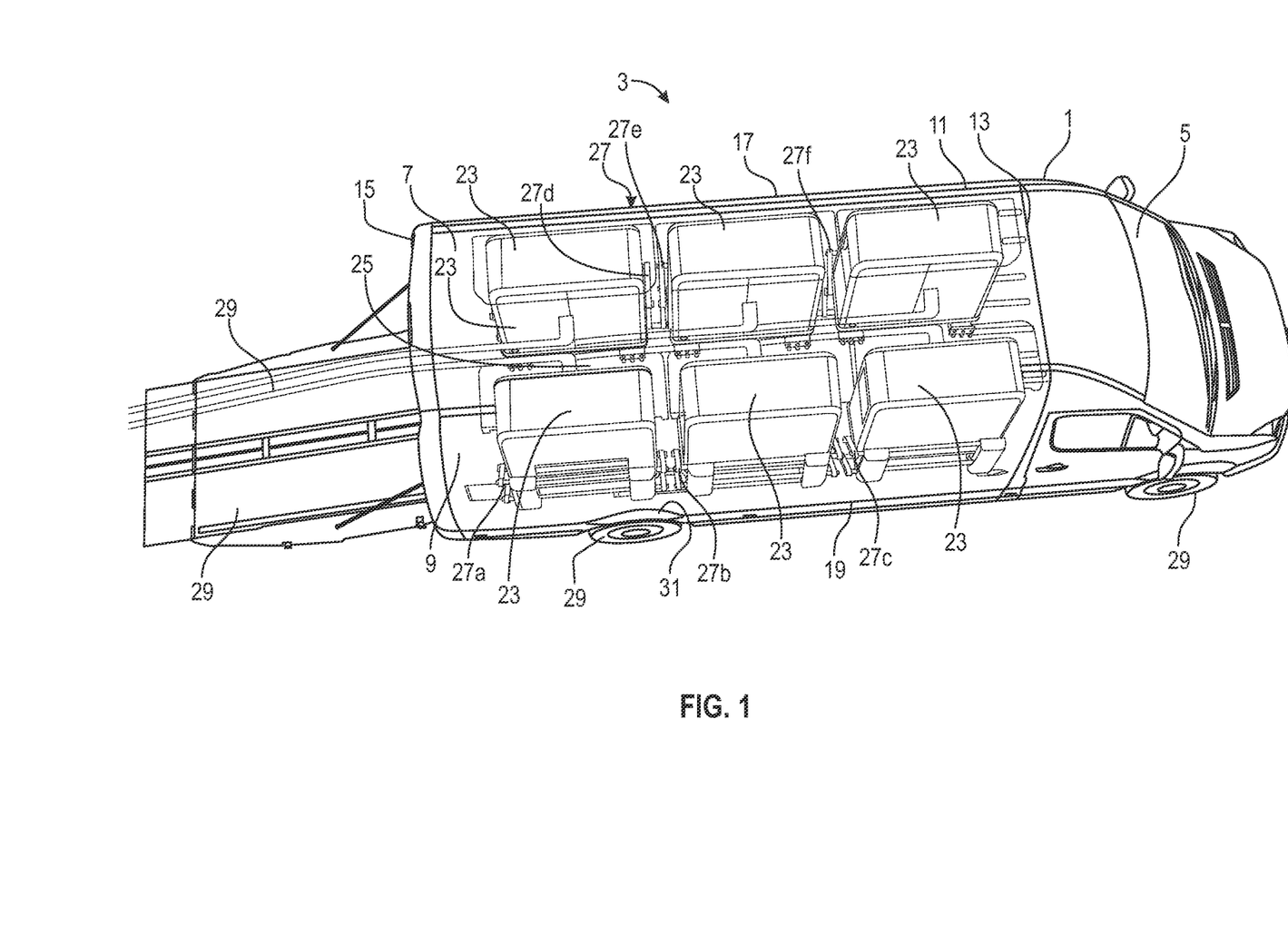
FIG. 1 is a perspective view of a cargo van illustrating the interior of a cargo space.

As illustrated in FIG. 1, three containers (23) per side may be optimal for certain cargo space (7) lengths, although the cargo management system (3) allows for any suitable number of containers (23) per side. Depending on the type of cargo being transported, the containers (23) may be larger or smaller. Typical cargo includes, or exclusively comprises, packages (41). In addition, shorter or longer wheelbase vehicles may be employed depending on the desired application, available parking conditions, etc.

When the containers (23) are stowed against the side walls (17, 19), a central corridor (25) between the stowed containers (23) remains. The central corridor (25) permits loading and unloading of containers (23) and access to the containers (23) by a vehicle operator or other persons, as required. Each container (23) is held in place adjacent the side walls (17, 19) and moved into and out of the corridor (25) using a stowage mechanism (27).

A typical van (1) has four wheels (29), although other wheel configurations are possible. A portion of each wheel (29) generally protrudes above the level of the floor (9) of the cargo space (7). The wheels (29) sit partly within wheel wells (31) which separate the wheels (29) from the cargo space (7). Thus, in the vicinity of the wheels (29), the floor (9) is obstructed by the wheel wells (31) which makes it impossible to line containers closely adjacent the side walls (17, 19) at the level of the floor (9) where the wheel wells (31) are located.

Figure 2:
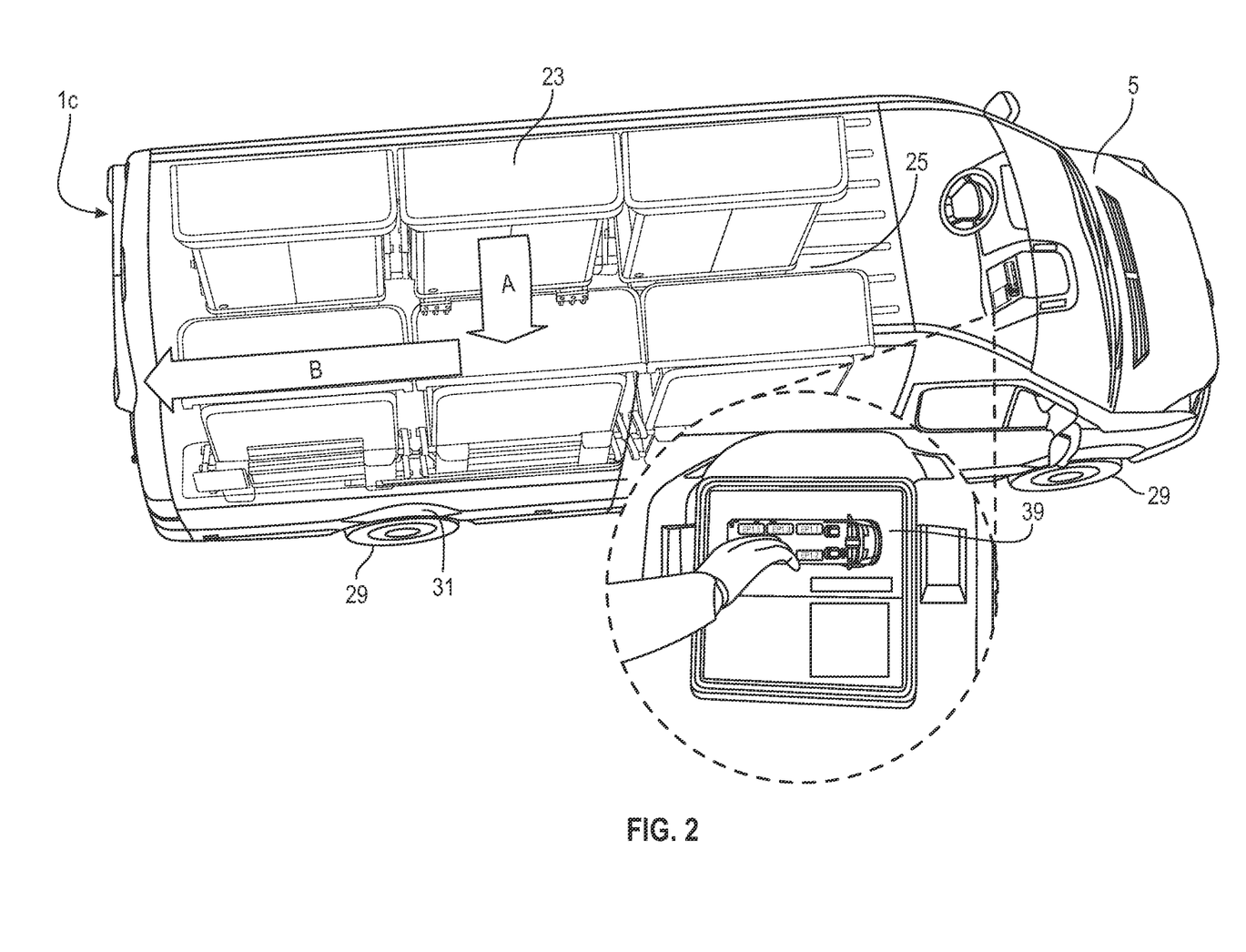
FIG. 2 is a perspective view of the cargo van showing movement of containers in the cargo space with an enlargement of a control panel located in the van cab.

Accordingly, the stowage mechanism (27) is adapted to engage a container (23) resting on the floor (9), to raise the container (23) to a point above the wheel wells (31), and to draw the container (23) to a stowed position adjacent a side wall (17, 19). The stowage mechanism (27) may comprise multiple stowage mechanism modules (27a to 27f). An individual stowage mechanism module (27a to 27f) may be provided for each container (23), or a unitary stowage mechanism (27) may move all containers at once while capturing or releasing only the desired container or containers (23). Clearly, moving only a single container (23) at a time is more energy efficient than moving all containers (23) each time a container (23) must be stowed or retrieved. Typically, a single container (23) will be stowed at each stowage mechanism module (27a to 27f). Direction of movement of a container (23) laterally in the corridor (25) then longitudinally rearward in the storage space (7) is illustrated by the arrows (A, B) in FIG. 2. Electric motors typically provide the motive force to move containers (23) into and out of their stowed positions.

Figure 6:
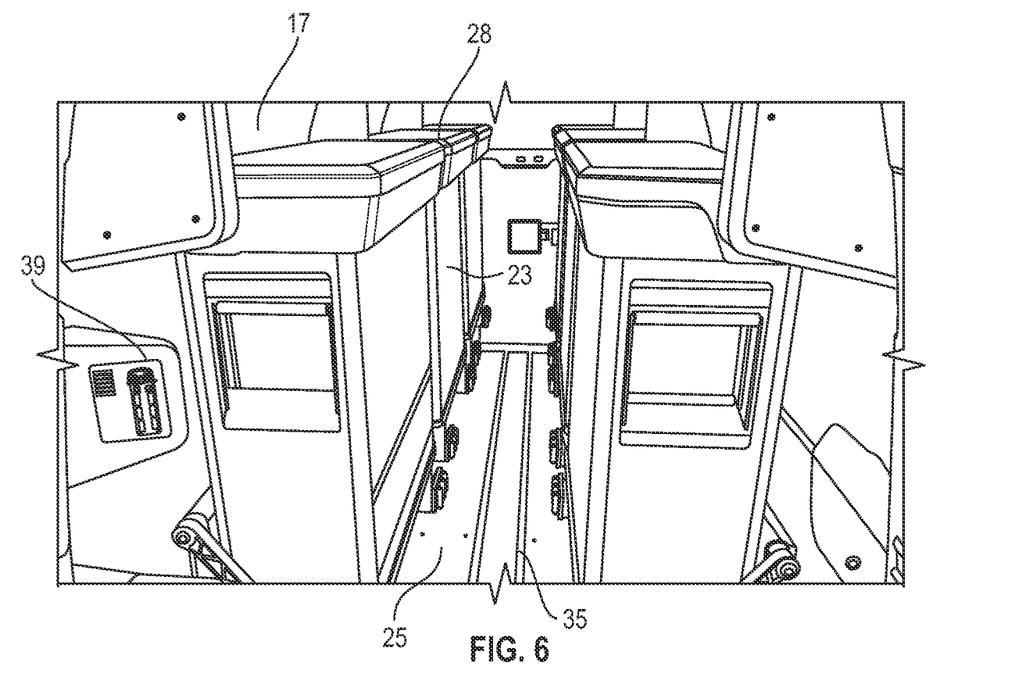
FIG. 6 is a perspective, partial view of a cargo space from the rear of a van showing closed access to the cab and three stowed containers per side.
Figure 7:
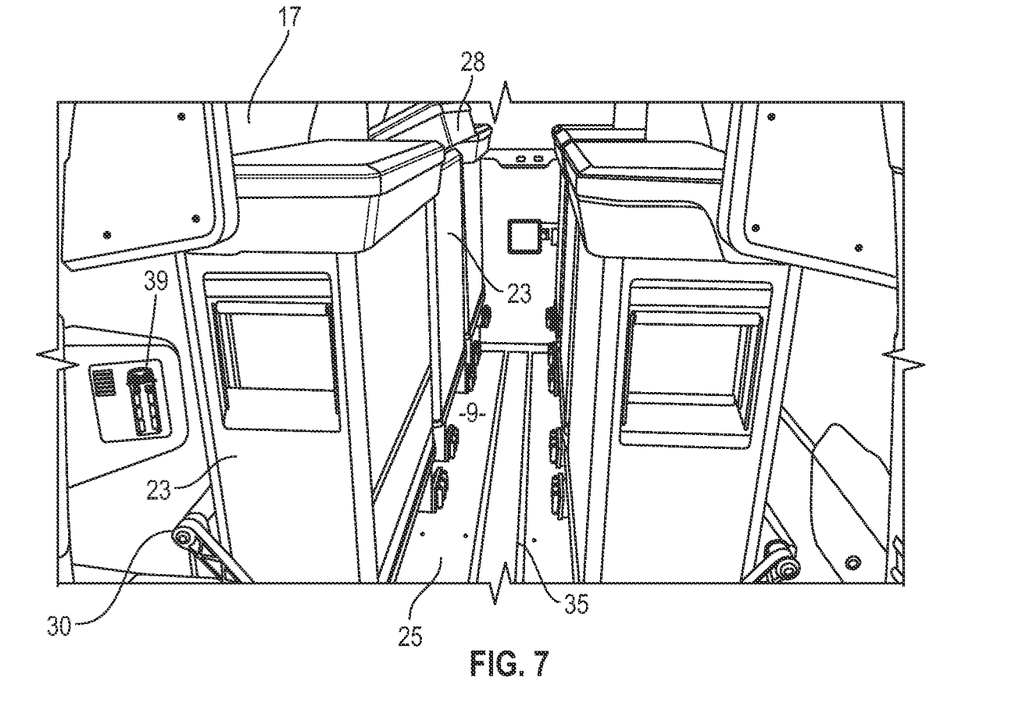
FIG. 7 is the view of FIG. 6 showing a storage mechanism module initiating release of a stowed container.
Figure 8:
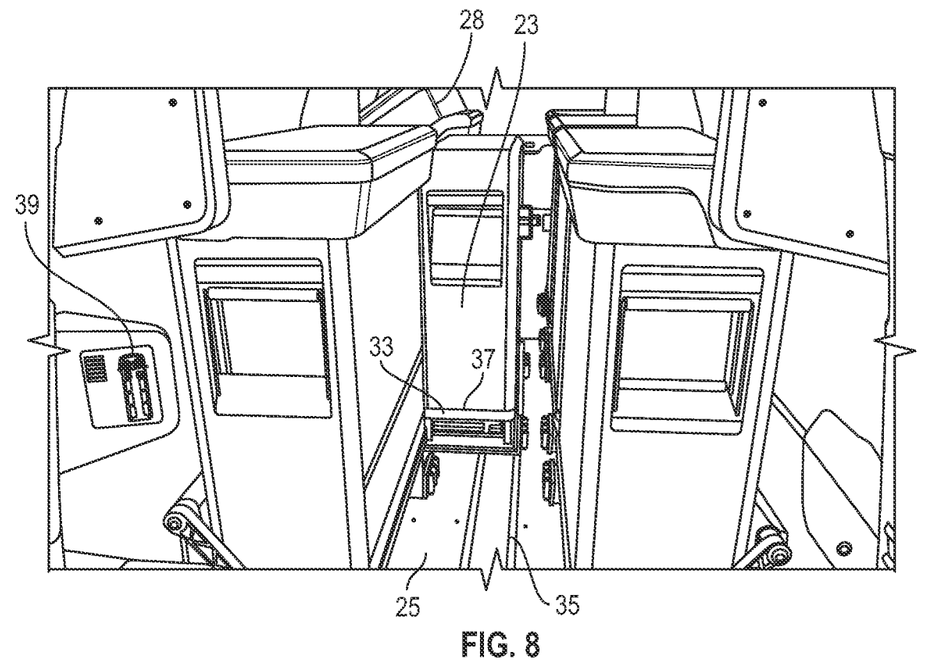
FIG. 8 is the view of FIG. 6 showing the container partially deployed by the storage mechanism module.
Figure 9:
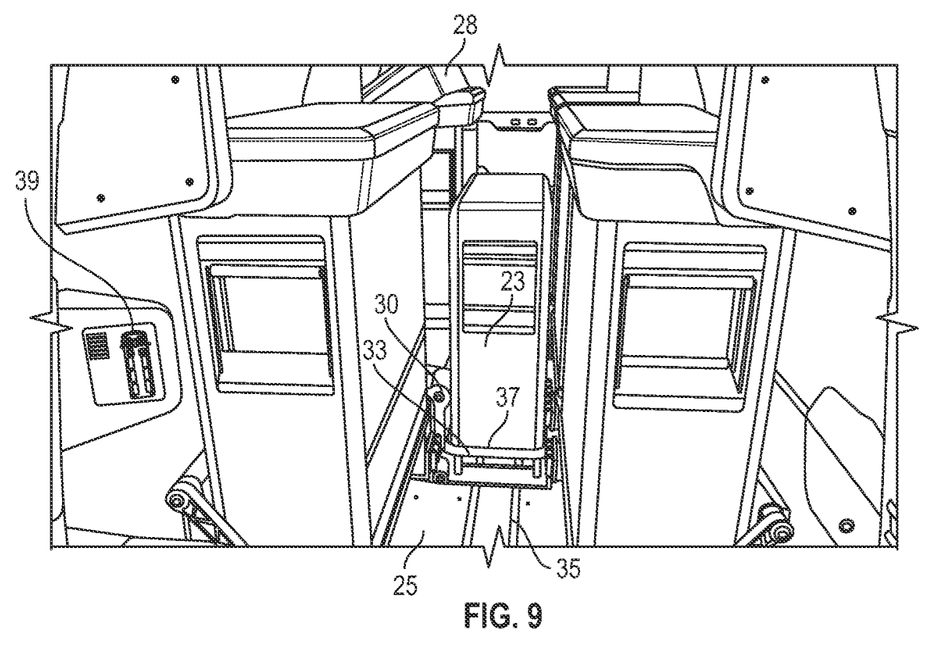
FIG. 9 is the view of FIG. 6 showing the container lowered to floor level.
Figure 10:
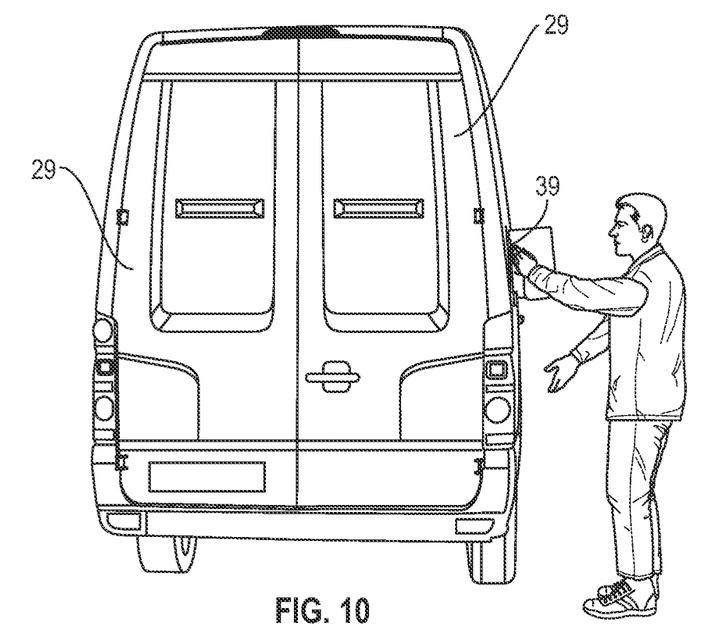
FIG. 10 is a rear, elevation view of a van showing the rear doors closed and an operator accessing a control panel.
Figure 11:
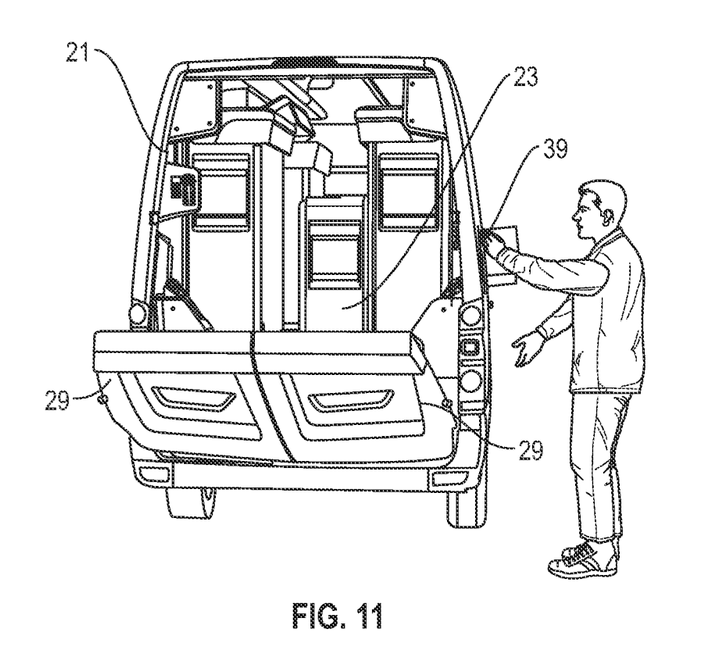
FIG. 11 is the view of FIG. 10 with a single container deployed to a central corridor on the floor and the doors partially deployed as a ramp.
Figure 12:
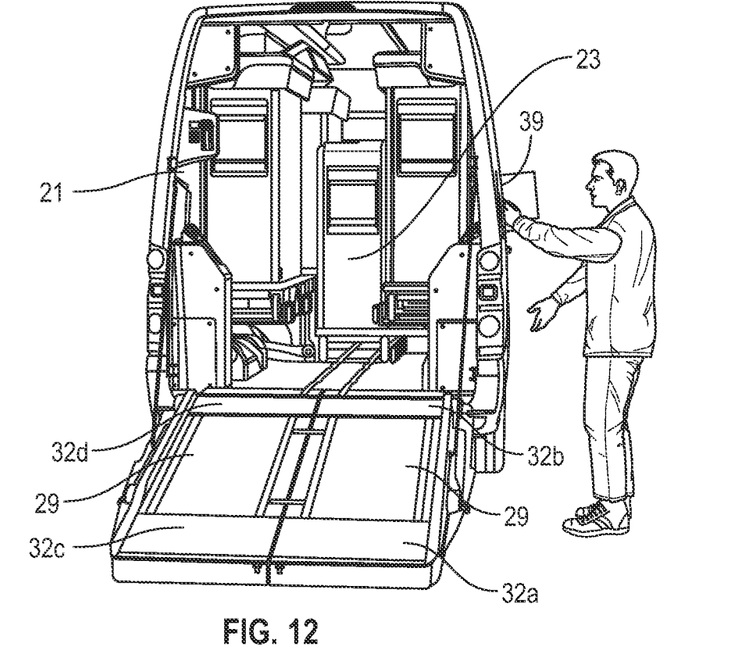
FIG. 12 is the view of FIG. 11 with the doors fully deployed as a ramp.
Figure 13:
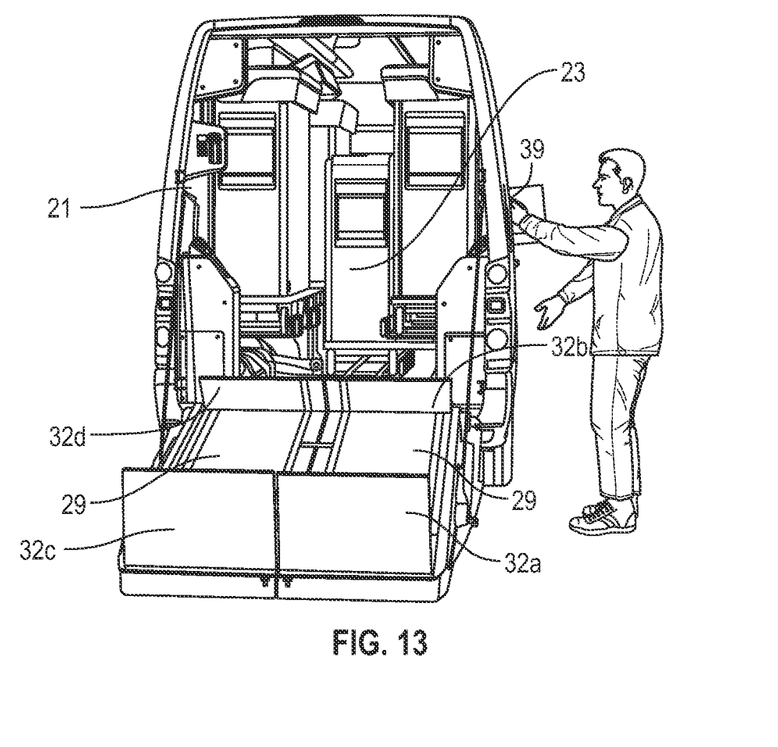
FIG. 13 is the view of FIG. 12 with flaps at either end of the ramp partially deployed.
Figure 14:
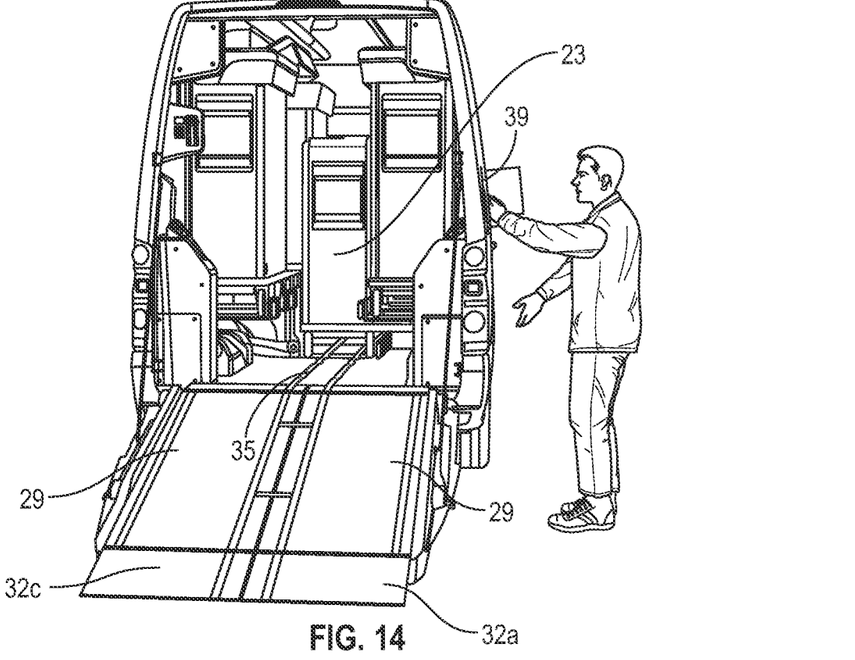
FIG. 14 is the view of FIG. 13 with flaps at either end of the ramp fully deployed.
Figure 15:
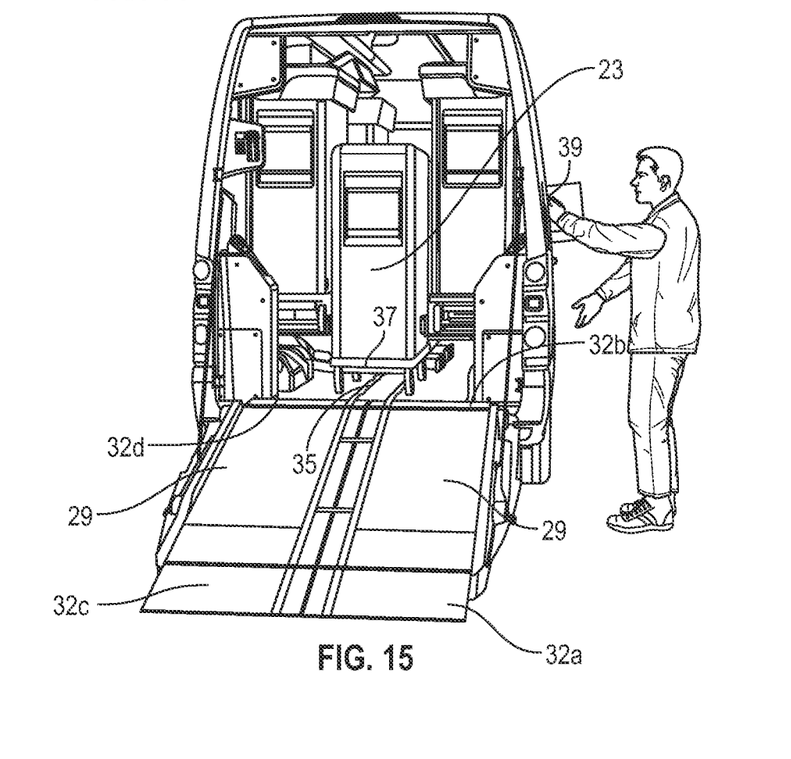
FIG. 15 is the view of FIG. 14 with a container moving from the position of FIG. 11 towards the ramp.
Figure 16:
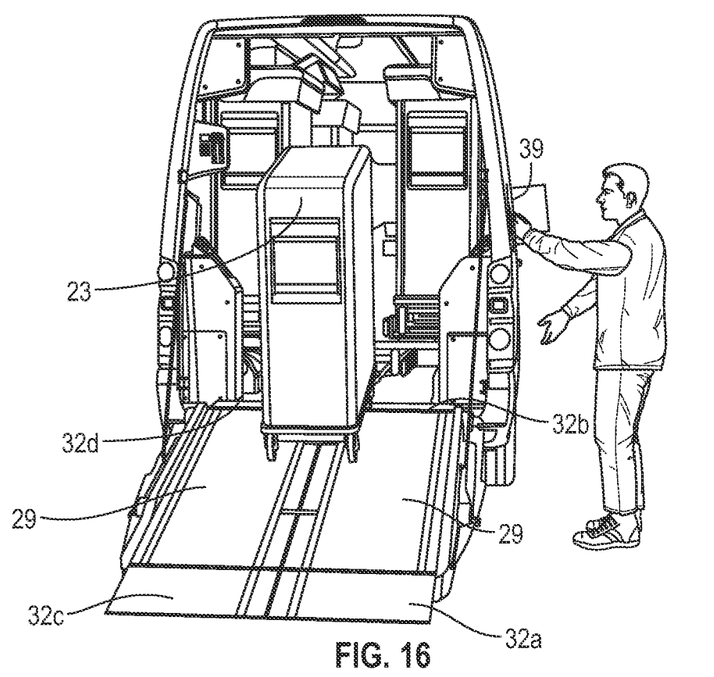
FIG. 16 is the view of FIG. 14 with a container part way down the ramp.
Figure 17:
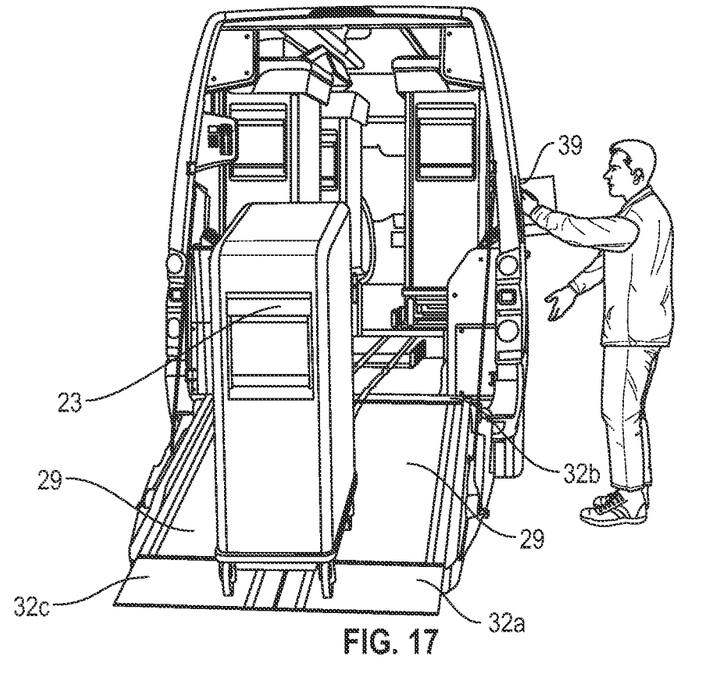
FIG. 17 is the view of FIG. 14 with a container near the end of the ramp.

The function of a representative stowage mechanism module (27d) is illustrated in FIGS. 6 to 9. In FIG. 6, a container (23) is stowed adjacent a sidewall (17) above the level of the wheel well (31) and restrained from movement by a cap (28) which captures a portion of the top of the container (23). As illustrated in FIG. 7, in order to release the container (23), the cap (28) is rotated upwardly and rearwardly around a joint adjacent the sidewall (17) until the container is free to translate towards the corridor (25). As shown in FIGS. 8 and 9, a linkage mechanism (30) moves the container (23) laterally into the corridor (25) and then lowers the container (23) to the level of the floor (9). A cap (28) and the linkage mechanism (30) form part of each stowage mechanism module (27a to 27f). The container (23) may rest on a platform or be engaged and released by arms of the linkage mechanism (30).

When the containers (23) are appropriately sized to allow it, however, the stowage mechanism (27) may be configured to stack multiple containers at each individual stowage mechanism module (27a to 27f). For example, it may be desirable to stow two containers (23) at each such stowage mechanism module (27a to 27f); one container (23) will be stacked above the other container (23) when both are stowed. Since a container (23) must be located on the floor (9) in the corridor (25) adjacent a stowage mechanism module (27a to 27f) in order to be engaged, lifted and stowed, typically a single container (23) will be moved at any one time by any individual stowage mechanism module (27a to 27f). Multiple containers (23) may be placed in the corridor (25) and engaged simultaneously by individual stowage mechanism modules (27a to 27f). For example, in a configuration allowing three containers (23) per side to be stowed, and with three containers (23) arranged longitudinally on the floor (9) in the corridor (25), two storage mechanism modules (e.g., 27a and 27b, or 27b and 27c, or 27a and 27c) may stow two containers on one side of the cargo space (7) while one storage mechanism module (e.g., 27f, 27d or 27e) may simultaneously stow one container (23) on the opposite side of the cargo space (7). Alternatively, the three containers (23) may be stowed separately and individually in series. Similar considerations apply to removing containers from stowage for placement on the floor (9) in the corridor (25). Any suitable combination of simultaneous stowage and removal of containers (23) is acceptable as long as containers (23) do not compete with each other for space on the floor (9) in the corridor (25).

Figure 3:
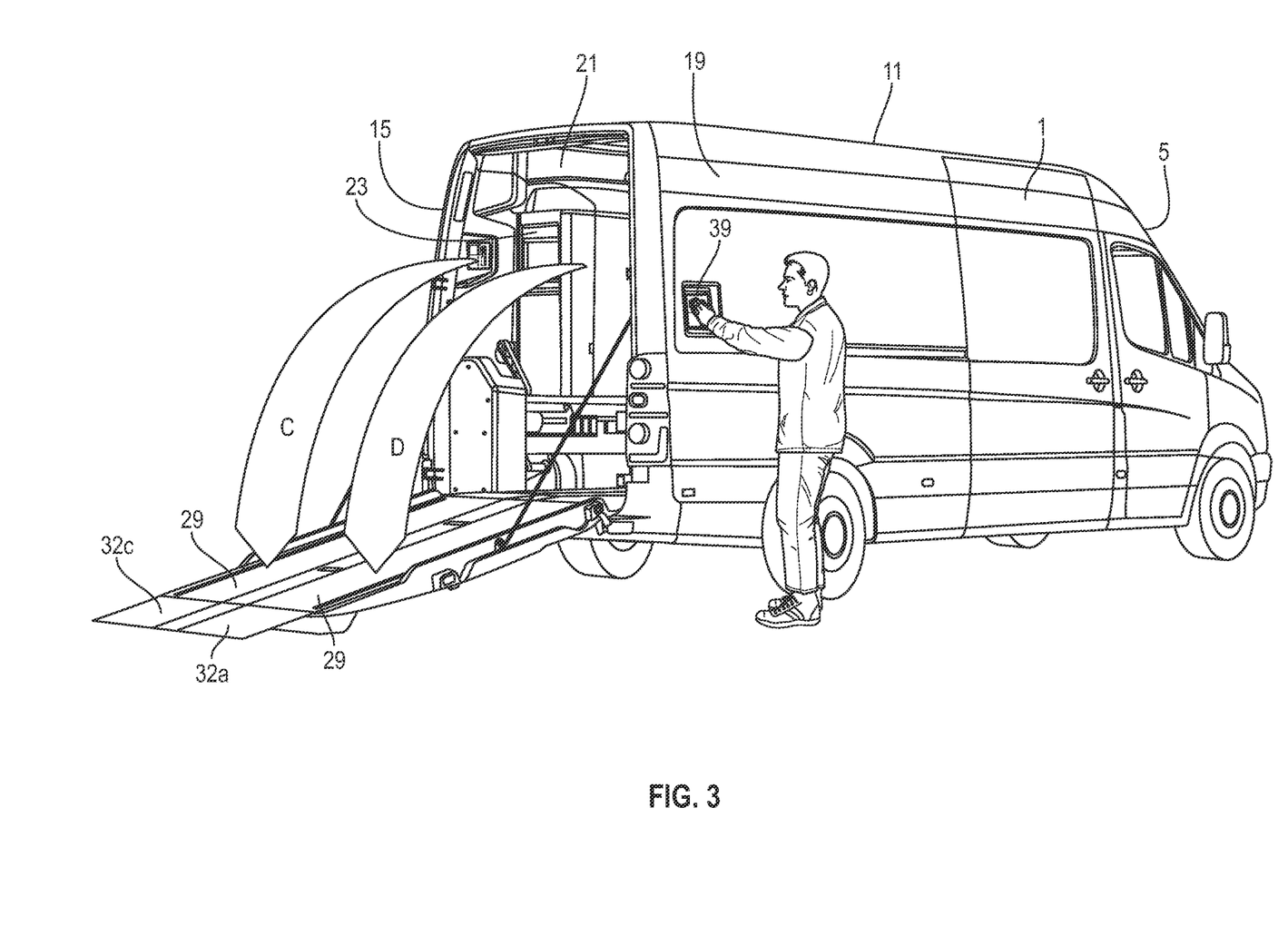
FIG. 3 is a perspective view of a cargo van showing use of rear doors as a ramp and a control panel located adjacent a rear opening.
Figure 4:
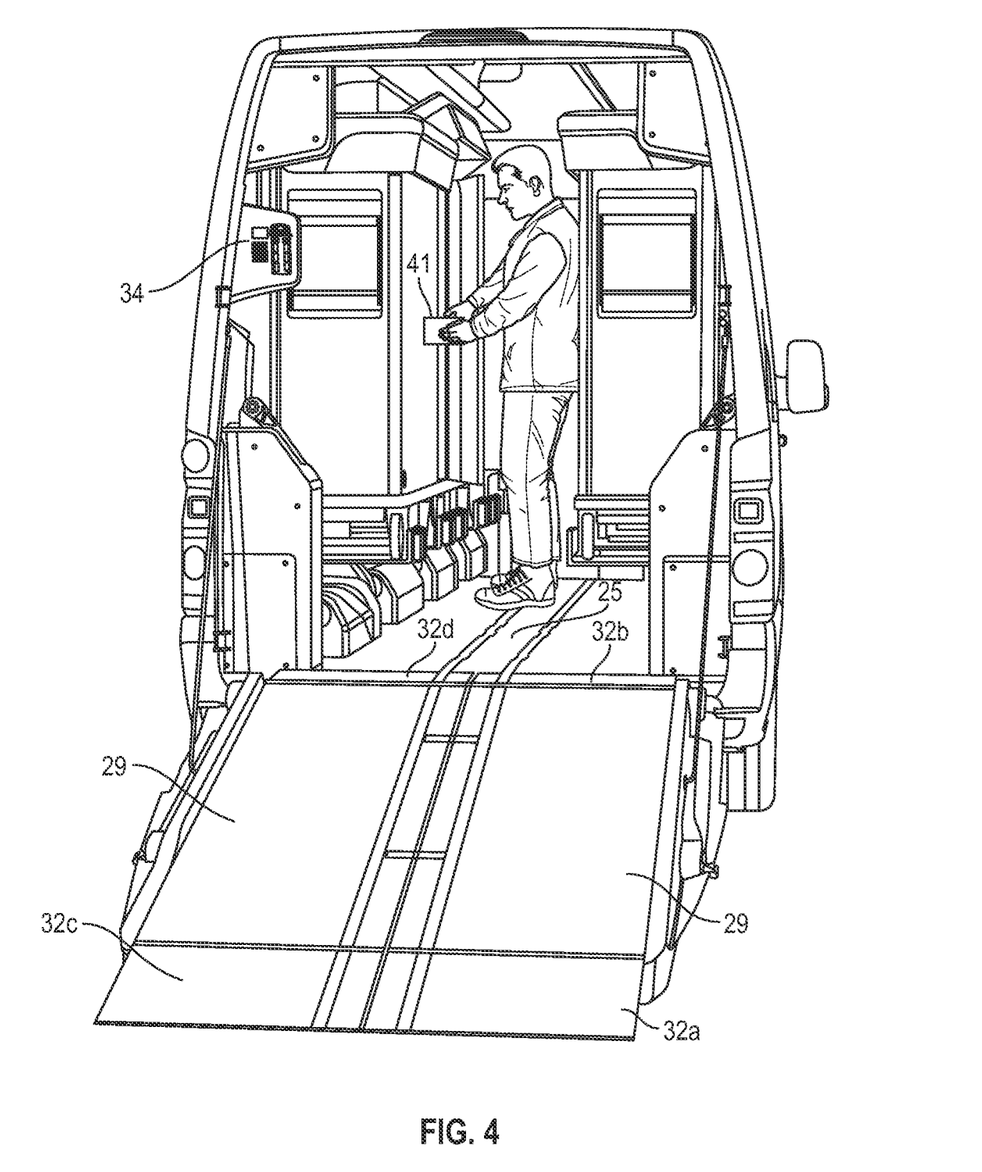
FIG. 4 is a perspective view from behind a van showing the dual acting doors and ramp deployed and an operator accessing contents of a container stowed in the cargo space.
Figure 5:
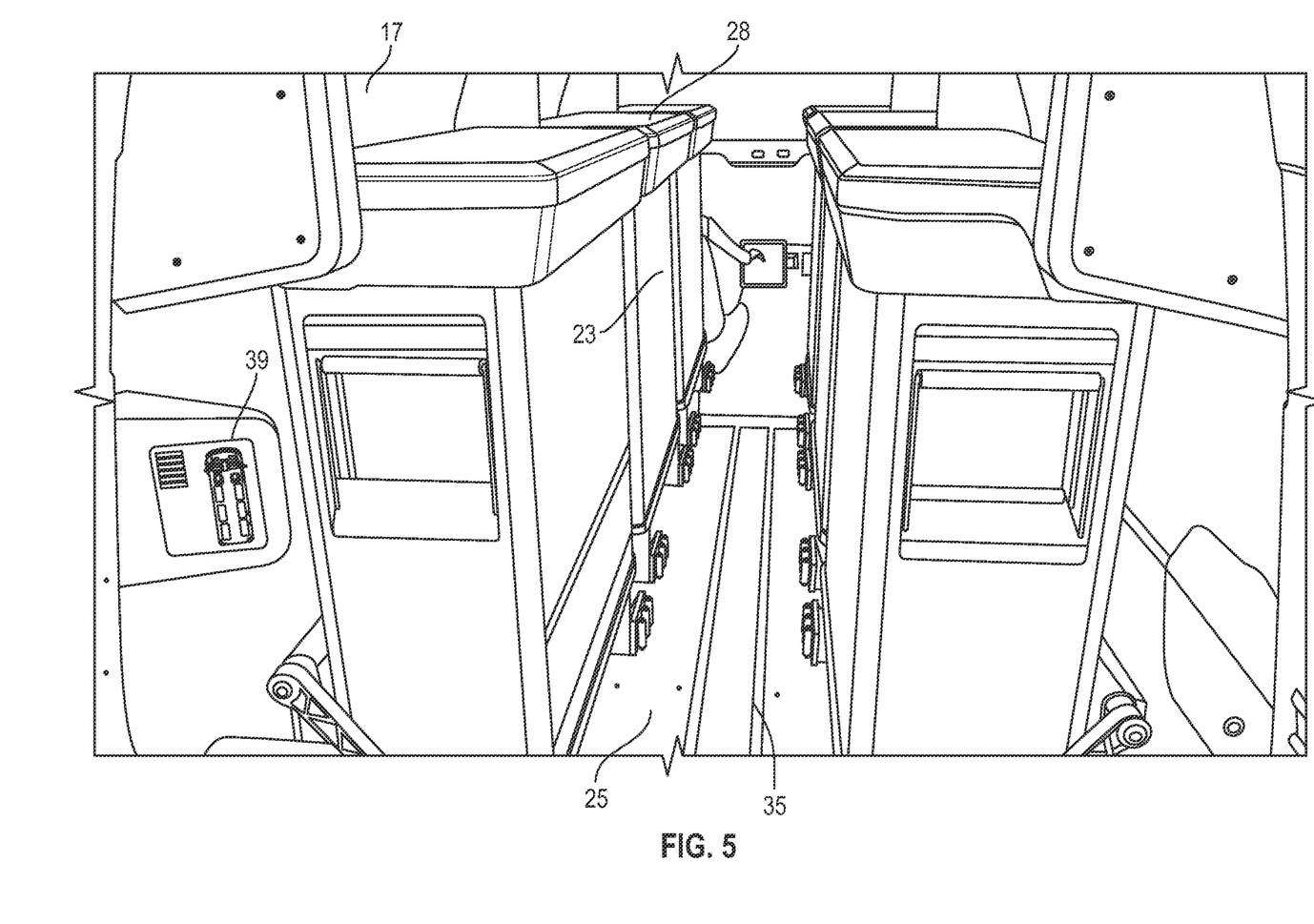
FIG. 5 is a perspective, partial view of a cargo space from the rear of a van showing an operator in the cab and open access to the cab.

The arrangement of containers (23) stowed adjacent the side walls (17, 19) of the cargo space (7) with a central longitudinal corridor (25) lends itself to access to the storage space (7) from the rear of the van (1) through rear opening (21) in rear wall (15). In order to prevent unwanted access to the cargo space (7), and for safety considerations, the rear opening (21) is typically provided with one or two doors (29). A single door (29) may swing to the side to expose the rear opening (21). A pull-out ramp may be provided at the rear of the van (1) to facilitate loading and unloading of containers (23). More preferably, the door or doors (29) may fold down to serve as a ramp or ramps. Arrows (C, D) in FIG. 3 illustrate the direction of motion of the doors (29) rotating open to function as a ramp. FIG. 4 illustrates a deployed ramp while FIGS. 10 to 14 illustrate deployment of the ramp. Such a dual acting door and ramp system is described in applicant's co-pending application PCT/CA2022/051081. Flaps (32a, 32b, 32c, 32d) are located at either end of the ramp to close gaps between the van floor (9) and the doors (29) as well as between the doors (29) and ground level, or as required depending on loading and unloading conditions. Alternatively, an elevating platform may be employed to lower containers (23) from the level of the floor (9) to ground level or another appropriate loading level.

Preferably, wheeled containers (23), as illustrated in FIGS. 12 to 17, are employed to facilitate movement of the containers (23) into and out of the storage space (7). Unpowered wheeled containers (23) may be rolled into and out of the storage space (7) by a human operator. Powered wheeled containers (23) controlled on-site by a human operator, remotely by a remote operator or autonomously, provide the benefit of ease of loading and unloading containers as well as the option of remote control. An electrical or magnetic strip, or a series of sensors (35), preferably located at or about the center-line of the corridor (25), along with appropriate electrical, magnetic or EMF sensors (37) adjacent the base (33) of each container (23) may be employed to direct movement of the containers (23). Such movement may be directed by a controller (39). The controller (39) may be mounted in the cab (5) or adjacent the rear (1c) of the van (1) to facilitate on-site human operator control. The controller (39) may also be incorporated into a hand-held unit so that a human operator may control the movement of containers (23) from any convenient vantage point in the vicinity of the van (1). Alternatively, the controller (39) may be controlled remotely by an operator at a central location, which is particularly useful in the case of autonomous vehicles.

Typically, each container (23) will contain multiple individual packages (41) which are advantageously loaded into the container (23) at a central location, such as a depot. The packages (41) may also advantageously be grouped by geographical destination so that a container (23) may be unloaded from the van (1) then opened to allow delivery of individual packages (41). Each package (41) may advantageously be provided with a means of electronic or electromagnetic identification, such as RFID. Each container (23) may also advantageously be provided with a means of electronic or electromagnetic identification (43), such as RFID. In this way, the identification and tracking of each container (23) and package (41) is facilitated. Alternatively, the containers (23) but not the packages (41) may be so electronically labelled, or vice versa. A container (23) may be automatically selected for release to the cargo space floor (9) upon arrival at the delivery location. The arrival signal may be triggered automatically by GPS data, by an operator on-site or located remotely noting arrival at an address, or by other suitable means such as RFID tags, or other electronic, magnetic or electromagnetic devices, located along a standard delivery route which are sensed by a device located on or in the van. Systems to ensure that the containers (23) may only be moved when the van is stopped, or that the van may only be moved when the containers (23) are safely stowed, may be provided. For example, the system may require that the gears be placed into "Park" mode before movement of containers (23) from stowage may be initiated. Conversely, a signal that all containers (23) are safely stowed may be made a prerequisite to shifting the van gears into "Drive" mode.

Although a human operator may be present to secure the cargo space (7) contents, the containers (23) will typically be locked until it is required to access their contents, namely the packages (41) or other cargo. An operator retrieving a package (41) from a container (23) is illustrated in FIG. 4. In the case of autonomous vehicles, on the other hand, with no human operator present at all times, maintaining the containers (23) locked until needed is even more important. In the case of an automated van (1), a container (23) which has been stowed during transit will be unloaded at a selected stop location. At that point, it will be taken by a human delivery person who will be able to access the contents by opening the locked container (23), or the container may be unlocked remotely so that the human delivery person has less discretion, which may add to security of the cargo. Alternatively, a container (23) unloaded from a cargo space (7) may be transferred to an autonomous, or remotely controlled, delivery device, such as a truck, trolley, wagon or helicopter.

On some occasions, it may be desirable to allow a human operator to access the contents of a container (23) while it is stowed to remove a single package (41) or a small number of packages (41). In this case, the human operator may enter the cargo space (7) through the rear opening (21). Alternatively, passage from the cab (5) through the front wall (13) may be permitted. The passage may be a permanent opening, as illustrated, or an opening provided with a cab access door, not illustrated. Typically, the human operator would employ the remote control (43) or a dedicated key or fob to unlock a selected container (23) and then to relock the container (23).

As previously noted, in order to ensure that containers (23) are not damaged during transit, or do not present a safety hazard, a safety interlock system may be employed to ensure that all containers (23) or trolleys are securely stowed before the van (1) may be placed into motion. This system may control the van gear shift to prevent shifting into drive mode gear until there is electronic verification that all containers or trolleys are safely stowed. Conversely, an electronic signal that the van gear shift has been placed into park mode may be required before containers (23) may be moved from a stowed position.

It should be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A van cargo management system comprising:
   a generally rectangular van cargo space with a floor and opposing side walls adapted to hold multiple containers;
   a rear opening providing ingress to and egress from the cargo space;
   at least one stowage mechanism adjacent one of the side walls and adapted to capture a selected container from the cargo space floor and to draw the container towards a side wall too one of a plurality of stowed positions adjacent said side wall at a distance above the floor and to return the selected container to the cargo space floor.

2. The van cargo management system of claim 1, wherein the at least one stowage mechanism is adapted to lift the selected container from the cargo space floor to a height above interior wheel wells in the cargo space and to stow the selected container at said height.

3. The van cargo management system of claim 2, wherein the at least one stowage mechanism comprises a stowage mechanism on each side of the cargo space.

4. The van cargo management system of any one of claims 1 to 3, further comprising a central corridor to facilitate loading and unloading of containers respectively into and out of the cargo space.

5. The van cargo management system of claim 3, further comprising multiple containers, wherein each stowage mechanism comprises multiple stowage mechanism modules, each stowage mechanism module adapted to stow and release one of the multiple containers.

6. The van cargo management system of claim 5, further comprising at least one locking mechanism and at least one linkage mechanism for each container adapted to move the container to a stowed position, to hold the container in the stowed position and to release the container from the stowed position.

7. The van cargo management system of claim 1, further comprising one of a ramp and an elevating platform mounted adjacent the rear opening to facilitate ingress and egress of containers respectively into and out of the cargo space.

8. The van cargo management system of claim 1, wherein the containers comprise wheeled trolleys.

9. The van cargo management system of claim 1, wherein the containers are provided with a wireless identification means to facilitate selection of a stowed container for release to the cargo space floor at a delivery location.

10. The van cargo management system of claim 9, wherein each container is individually and automatically selected for release by an arrival signal triggered by one or more of GPS data, and fixed electronic, magnetic or electromagnetic devices located along a standard delivery route.

11. The van cargo management system of claim 1, wherein the containers are adapted to hold packages.

12. The van cargo management system of claim 11, wherein the packages are provided with a wireless identification means to facilitate selection of a package in a stowed container for release.

13. The van cargo management system of claim 1, further comprising at least one rear door which may be closed and locked to prevent access to the cargo space from the exterior of the van and unlocked and opened to facilitate loading and unloading of containers.

14. The van cargo management system of claim 13, wherein the at least one rear door further functions as a ramp.

15. The van cargo management system of claim 1, further comprising a controller located on an interior of the van, mounted on an exterior of the van, hand-held or operated remotely to control the release from a stowed position of one or more containers comprising wheeled trolleys.

16. The van cargo management system of claim 1, wherein at least one container is automatically selected for release to the cargo space floor upon arrival at the delivery location.

17. The van cargo management system of claim 1, further comprising floor guide means on the floor and corresponding container guide means on the containers which sense or communicate electromagnetically to facilitate location of the containers during ingress and egress of containers from the cargo van space.

18. The van cargo management system of claim 1, further comprising a safety interlock system comprising at least one of a requirement for a van park gear mode signal to permit release of containers from stowed positions, and a requirement for a signal that all containers are safely stowed to permit a van drive gear mode to be engaged.

* * * * *